(12) United States Patent
Siminoff

(10) Patent No.: US 10,839,204 B2
(45) Date of Patent: Nov. 17, 2020

(54) SHARING IDENTIFICATION DATA WITH AUDIO/VIDEO RECORDING AND COMMUNICATION DEVICES AND LOCAL PROCESSING OF THE SHARED DATA

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 15/959,164

(22) Filed: Apr. 20, 2018

(65) Prior Publication Data

US 2018/0307903 A1    Oct. 25, 2018

Related U.S. Application Data

(60) Provisional application No. 62/489,711, filed on Apr. 25, 2017.

(51) Int. Cl.
*G06K 9/00* (2006.01)
*G06Q 50/26* (2012.01)
*G06K 9/32* (2006.01)

(52) U.S. Cl.
CPC ...... *G06K 9/00369* (2013.01); *G06K 9/00711* (2013.01); *G06K 9/00771* (2013.01); *G06K 9/3241* (2013.01); *G06Q 50/265* (2013.01)

(58) Field of Classification Search
CPC ........... G06K 9/00369; G06K 9/00771; G06K 9/00711; G06K 9/3241; G06Q 50/265
See application file for complete search history.

(56) References Cited

U.S. PATENT DOCUMENTS

| 4,764,953 | A | 8/1988 | Chern et al. |
| 5,428,388 | A | 6/1995 | von Bauer et al. |
| 5,760,848 | A | 6/1998 | Cho |
| 6,072,402 | A | 6/2000 | Kniffin et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

Ahn, Jeong Hwan, International Search Report and Written Opinion of the International Searching Authority for PCT/US/2018/023156, dated Aug. 28, 2018, International Application Division, Korean Intellectual Property Office, Republic of Korea.

*Primary Examiner* — Yon J Couso
(74) *Attorney, Agent, or Firm* — Greenberg Traurig, LLP

(57) ABSTRACT

Some aspects of the present embodiments provide an A/V recording and communication device that stores the identification data for one or more known persons and/or objects at a local memory of the device. Each time the A/V recording and communication device detects a person or an object, the A/V recording and communication device may capture identification data for the person or object and identify the detected person or object by comparing the identification data for the detected person or object (e.g., an image of the person and/or other biometric data related to the person) with the previously stored identification data.

21 Claims, 12 Drawing Sheets

(56) References Cited

U.S. PATENT DOCUMENTS

| | | |
|---|---|---|
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2007/0256105 A1 | 11/2007 | Tabe |
| 2010/0225455 A1 | 9/2010 | Claiborne et al. |
| 2013/0057695 A1 | 3/2013 | Huisking |
| 2013/0266190 A1 | 10/2013 | Wang et al. |
| 2014/0267716 A1 | 9/2014 | Child et al. |
| 2014/0293046 A1* | 10/2014 | Ni .................. H04N 7/181 348/143 |
| 2014/0313330 A1 | 10/2014 | Carey |
| 2015/0109112 A1 | 4/2015 | Fadell et al. |
| 2015/0163463 A1 | 6/2015 | Hwang et al. |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

\* cited by examiner

SHARING IDENTIFICATION DATA WITH AUDIO/VIDEO RECORDING AND COMMUNICATION DEVICES AND LOCAL PROCESSING OF THE SHARED DATA

CROSS-REFERENCE TO RELATED APPLICATION

This application claims priority to provisional application Ser. No. 62/489,711, filed on Apr. 25, 2017, the entire contents of which are hereby incorporated by reference.

TECHNICAL FIELD

The present embodiments relate to sharing identification data with audio/video (A/V) recording and communication devices (e.g., A/V recording and communication doorbell systems, A/V recording and communication security cameras, etc.) and local processing of the shared data.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells and security cameras, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present sharing of identification data with audio/video (A/V) recording and communication devices and local processing of the shared data have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that an A/V recording and communication device may employ one or more remote servers to identify a person or an object detected by the A/V recording and communication device. That is, conventional A/V recording and communication devices perform little (if any) process locally on images and/or other biometric data captured by the A/V recording and communication devices. For example, to identify a person detected by an A/V recording and communication device, the device captures and sends one or more images of the person to one or more backend devices (e.g., servers) for the servers to perform any necessary identification process (e.g., face recognition) on the image(s) of the person. As a result, the identification process may incur unwanted delays due to various factors such as the network delay (e.g., processing and transmission delay for both user and public networks), the processing speed of the backend servers, the number of tasks performed by the backend servers, etc.

The present embodiments solve this problem by performing all or part of the computer vision process (e.g., face and object recognition, fingerprint recognition, etc.) locally at the A/V recording and communication device(s). In some of the present embodiments an A/V recording and communication device may receive, from a backend device such as a server, the identification data for one or more known persons and/or objects, and store the received identification data at a memory of the A/V recording and communication device. Each time an A/V recording and communication device detects a person or an object, the A/V recording and communication device may capture identification data for the person or object (e.g., capture video images of a person that is within a field of view of a camera of the A/V recording and communication device) and may identify the detected person or object by comparing the identification data for the detected person or object (e.g., an image of the person and/or other biometric data related to the person) with the previously stored identification data.

In a first aspect, a method for sharing identification data with a plurality of audio/video (A/V) recording and communication devices is provided, the method comprising receiving identification data for a person, and transmitting the identification data to the plurality of A/V recording and communication devices for storage at a memory of each of the A/V recording and communication devices and for local processing of the identification data by a processor of each of the A/V recording and communication devices, wherein the A/V recording and communication devices comprise a plurality of security cameras and/or a plurality of video doorbells.

In an embodiment of the first aspect, receiving the identification data comprises receiving the identification data from law enforcement.

In another embodiment of the first aspect, receiving the identification data comprises receiving the identification data from one of the plurality of A/V recording and communication devices.

In another embodiment of the first aspect, the identification data comprises biometric data of the person.

In another embodiment of the first aspect, the biometric data comprises an image of the person.

In a second aspect, a method for sharing identification data with a plurality of audio/video (A/V) recording and communication devices is provided, the method comprising receiving identification data for an object, and transmitting the identification data to the plurality of A/V recording and communication devices for storage at a memory of each of the A/V recording and communication devices and for local processing of the identification data by a processor of each of the A/V recording and communication devices, wherein the A/V recording and communication devices comprise a plurality of security cameras and/or a plurality of video doorbells.

In an embodiment of the second aspect, receiving the identification data comprises receiving the identification data from law enforcement.

In another embodiment of the second aspect, receiving the identification data comprises receiving the identification data from one of the plurality of A/V recording and communication devices.

In another embodiment of the second aspect, the object comprises a vehicle, and wherein the identification data comprises a license plate number of the vehicle.

In a third aspect, a method for identifying persons using an audio/video (A/V) recording and communication device having a camera is provided, the method comprising receiving, from a backend device in network communication with the A/V recording and communication device, identification data for a first person, storing the identification data at a memory of the A/V recording and communication device, capturing, using the camera of the A/V recording and communication device, image data for a second person, and determining whether the second person and the first person are the same person by comparing the image data for the second person with the identification data for the first person.

An embodiment of the third aspect further comprises sending a notification to a client device associated with the A/V recording and communication device when the first and second persons are determined to be the same person.

Another embodiment of the third aspect further comprises sending a notification to law enforcement when the first and second persons are determined to be the same person.

Another embodiment of the third aspect further comprises sending the image data for the second person to the backend device when the first and second persons are determined to be different persons.

In another embodiment of the third aspect, the A/V recording and communication device comprises a motion sensor, wherein the image data for the second person is captured in response to the motion sensor detecting the second person.

In another embodiment of the third aspect, the motion sensor comprises a passive infrared (PIR) sensor.

In another embodiment of the third aspect, the identification data for the first person comprises biometric data of the first person.

Another embodiment of the third aspect further comprises determining that the second person is acting suspiciously and sending the image data for the second person to the backend device.

In another embodiment of the third aspect, determining that the second person is acting suspiciously comprises determining that the second person is carrying a suspicious object.

In another embodiment of the third aspect, determining that the second person is carrying the suspicious object comprises performing a computer vision process on the image data for the second person.

In a fourth aspect, a method for identifying objects using an audio/video (A/V) recording and communication device having a camera is provided, the method comprising receiving, from a backend device in network communication with the A/V recording and communication device, identification data for a first object, storing the identification data at a memory of the A/V recording and communication device, capturing, using the camera of the A/V recording and communication device, image data for a second object, and determining whether the second object and the first object are the same objects by comparing the image data for the second object with the identification data for the first object.

An embodiment of the fourth aspect further comprises sending a notification to a client device associated with the A/V recording and communication device when the first and second objects are determined to be the same object.

Another embodiment of the fourth aspect further comprises sending a notification to law enforcement when the first and second objects are determined to be the same object.

Another embodiment of the fourth aspect further comprises sending the image data for the second object to the backend device when the first and second objects are determined to be different objects.

In another embodiment of the fourth aspect, the A/V recording and communication device comprises a motion sensor, and wherein the image data for the second object is captured in response to the motion sensor detecting the second object.

In another embodiment of the fourth aspect, the motion sensor comprises a passive infrared (PIR) sensor.

In another embodiment of the fourth aspect, the first and second objects are vehicles, and wherein the identification data for the first object comprises a license plate number of the first vehicle.

BRIEF DESCRIPTION OF THE DRAWINGS

The various embodiments of the present sharing of identification data with audio/video (A/V) recording and communication devices and local processing of the shared data now will be discussed in detail with an emphasis on highlighting the advantageous features. These embodiments depict examples the novel and non-obvious techniques for sharing identification data with audio/video (A/V) recording and communication devices and local processing of the shared data, which are for illustrative purposes only. These drawings include the following figures, in which like numerals indicate like parts.

DETAILED DESCRIPTION

Figure 1:
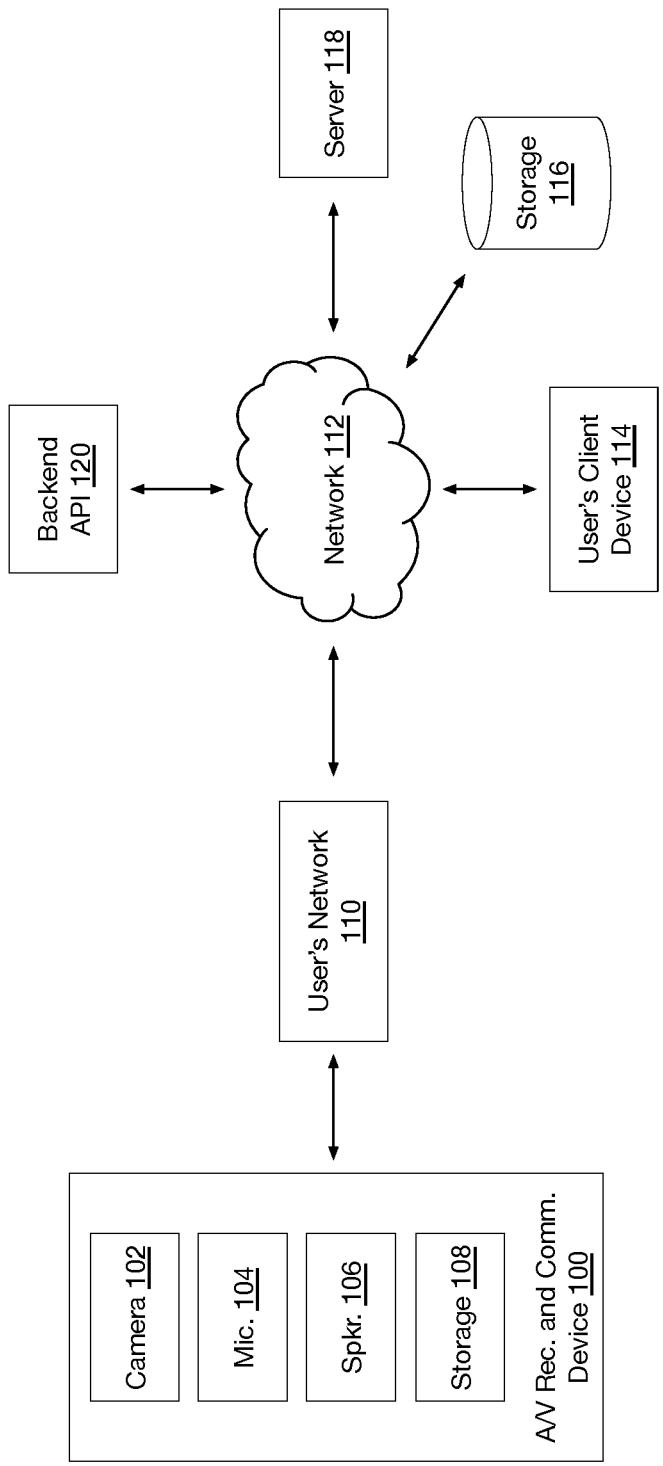
FIG. 1 is a functional block diagram illustrating a system for providing notifications to one or more users, and streaming and storing A/V content captured by an A/V recording and communication device, according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

With reference to FIG. 1, the present embodiments include an A/V recording and communication device 100 (e.g., a video doorbell, a security camera, etc.). While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera, as described below with reference to FIG. 3, may include substantially all of the structure and functionality of the doorbells described herein, but without the front button and its related components.

The A/V recording and communication device 100 may be located near the entrance to a structure (not shown), such as a dwelling, a business, a storage facility, etc. The A/V recording and communication device 100 includes a camera 102, a microphone 104, a speaker 106, and a storage 108. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button (e.g., a doorbell button), etc.

Additionally, the present disclosure provides numerous examples of methods and systems including A/V recording and communication devices that are powered by a connection to AC mains, but the present embodiments are equally applicable for A/V recording and communication devices that are battery powered. The A/V recording and communication device 100 may further include similar componentry and/or functionality as the wireless communication doorbells described in U.S. Pat. No. 9,584,775 (application Ser. No. 14/499,828) and U.S. Patent Publication No. 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone.

The user's network 110 may also be connected to other A/V recording and communication devices, such as the A/V recording and communication device 100, and/or other types of alert devices (e.g., in-home and outside alert devices) which are not shown in FIG. 1. An alert device, in some of the present embodiments, comprises a device that is capable of providing audible and/or visual alerts. Some examples of alert devices may include, but not limited to, a speaker capable of generating different sounds and/or verbal warnings, a light (e.g., a smart LED light bulb) capable of emitting light in different colors, etc.

The A/V recording and communication device 100 may also communicate with one or more remote storage device(s) 116 (may be referred to interchangeably as "cloud storage device(s)"), one or more servers 118, and/or a backend API (application programming interface) 120 via the network 110 (e.g., a personal wired or wireless network) and the network 112 (e.g., Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence using the camera 102, one or more motion sensors (not shown), and/or by detecting that the visitor has depressed a button (e.g., a doorbell button) on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, a two-way audio communication session may then be established between the visitor and the user through the A/V recording and communication device 100 and the user's client device 114. The user may view the visitor throughout the duration of the call, but the visitor cannot see the user in some embodiments. In some other embodiments, the A/V recording and communication device 100 may include a display screen, through which the visitor can also see the user (e.g., when the user wishes so). In some of the present embodiments, in addition to the above-described alert, a visual and/or verbal notification may be provided to any persons present at the property (e.g., when the visitor is determined to pose a threat, when the user has shown a higher level of interest in the visitor, etc.).

The video images captured by the camera 102 of the A/V recording and communication device 100 (and the audio captured by the microphone 104) may be uploaded to the cloud and recorded on the remote storage device 116. In some embodiments, the video and/or audio may be recorded on the remote storage device 116 even if the user chooses to ignore the alert sent to his or her client device 114. In some aspects of the present embodiments the remote storage device 116 and/or other storage devices may store one or more databases that contain biometric data for different known individuals and/or other types of identification data for objects (e.g., a convicted felon database, a stolen vehicles database, a suspicious people database, etc.). Some of the present embodiments retrieve identification data from these databases to identify a person or object detected by the A/V recording and communication device 100.

With further reference to FIG. 1, the A/V recording and communication device 100 may receive the identification data (e.g., from one or more storages such as the storage 116, from one or more servers such as the server 118 and backend API 120) and store the received data in storage 108. The storage 108 can be a permanent read-and-write memory device. This device can be a non-volatile memory unit that stores instructions and data even when the A/V recording and communication device 100 is off. Some of the present embodiments use a mass-storage device (such as a magnetic or optical disk and its corresponding disk drive, integrated flash memory) as the storage 108. Some other aspects of the present embodiments use a removable storage device (such as a floppy disk, flash memory device, etc., and its corresponding drive) as the storage 108.

To identify a person (or object) detected by the A/V recording and communication device 100, some aspects of the present embodiments compare the identification data (e.g., images and/or other biometric data and/or other data) for the detected person (or object) with identification data stored in the storage 108. For example, when the A/V recording and communication device 100 detects a visitor approaching the A/V recording and communication device 100 (e.g., using one or more motion sensors of the device), the camera 102 starts capturing video images of the visitor. Some of the present embodiments may compare the captured images (or at least one of the images) with images that are stored in the storage 108 (e.g., in one of the databases of the storage 108).

When the image of the visitor is matched against one of the known images stored in the storage 108, the A/V recording and communication device 100 may determine the exact identity of the visitor without requiring to communicate with other remote servers and/or storages. For example, if the image of the visitor is matched against an image of a known burglar stored in the storage 108, the A/V recording and communication device 100 may immediately notify one or more authorized users, and/or other occupants inside the property, of such using one or more client devices, such as the client device 114, and/or other in-home or outside alert devices. Some aspects of the present embodiments send the identification data for the visitor to one or more backend servers to identify the visitor when the identification data of the visitor is not matched against any of the databases stored in the storage 108.

With further reference to FIG. 1, the system may further comprise a backend application programming interface (API) 120 including one or more components. A backend API may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

As an example, in some of the present embodiments one or more API servers may receive (e.g., from the A/V recording and communication device 100) captured images and/or biometric data of a person at an entry of a property and use the received images/data to determine whether the person poses a threat or not. One or more of these backend servers may employ a set of computer vision processes (e.g., face recognition, iris recognition, or any other biometrics recognition process) and one or more databases (e.g., a database for convicted felons, registered sex offenders, etc.)

to recognize and report the severity of the threat (e.g., the threat level associated with the person).

The backend API 120 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming graphical user interface (GUI) components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
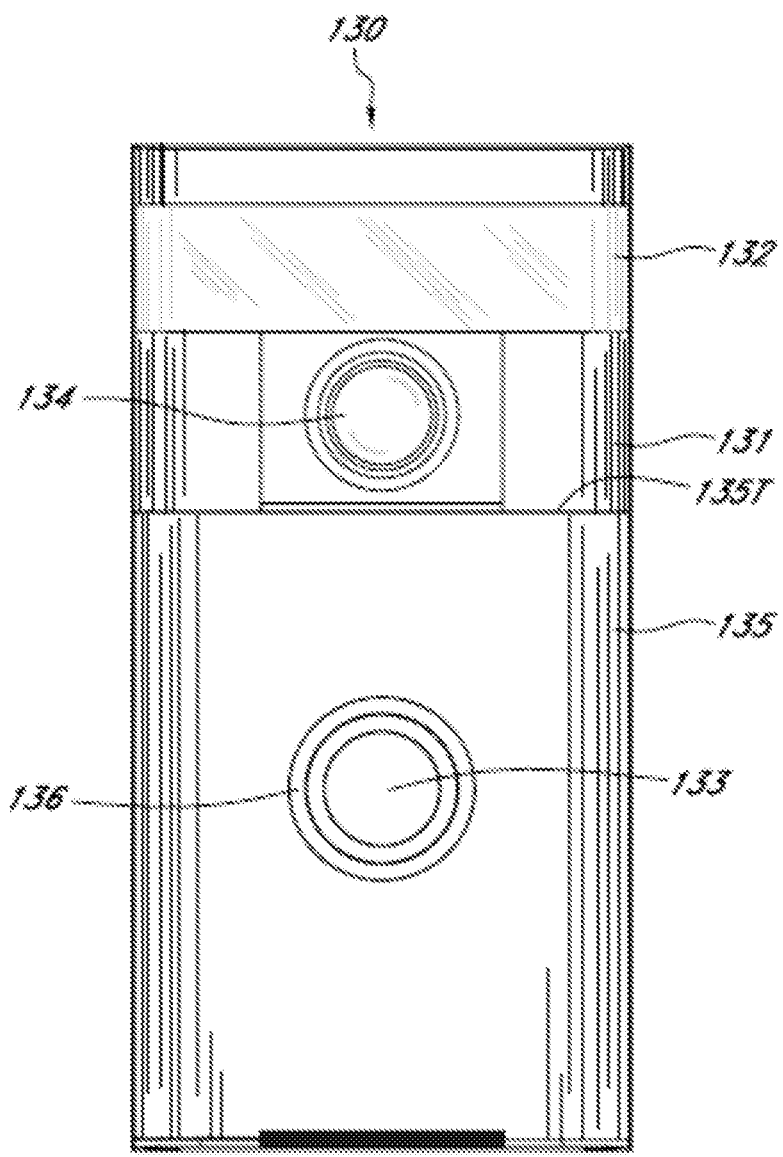
FIG. 2 is a front view of an A/V recording and communication doorbell, according to an aspect of the present disclosure.

FIG. 2 is a front view of an A/V recording and communication doorbell (also referred to as a video doorbell, or simply a doorbell, in some embodiments), according to an aspect of the present disclosure. FIG. 2 illustrates that the front of the video doorbell 130 includes a front button 133, a faceplate 135, and a light pipe 136. The button 133 may make contact with a button actuator (not shown) located within the doorbell 130 when the button 133 is pressed by a visitor. When pressed, the button 133 may trigger one or more functions of the doorbell 130, as further described below. The front button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's) 156 (FIG. 9), contained within the doorbell 130. In some aspects of the present embodiments when the battery 166 of the doorbell 130 is recharged through a connection to AC mains power, the LEDs 156 may emit light to indicate that the battery 166 is being recharged.

With further reference to FIG. 2, the doorbell 130 further includes an enclosure 131 that engages the faceplate 135 in some aspects of the present embodiments. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described above and below.

Figure 3:
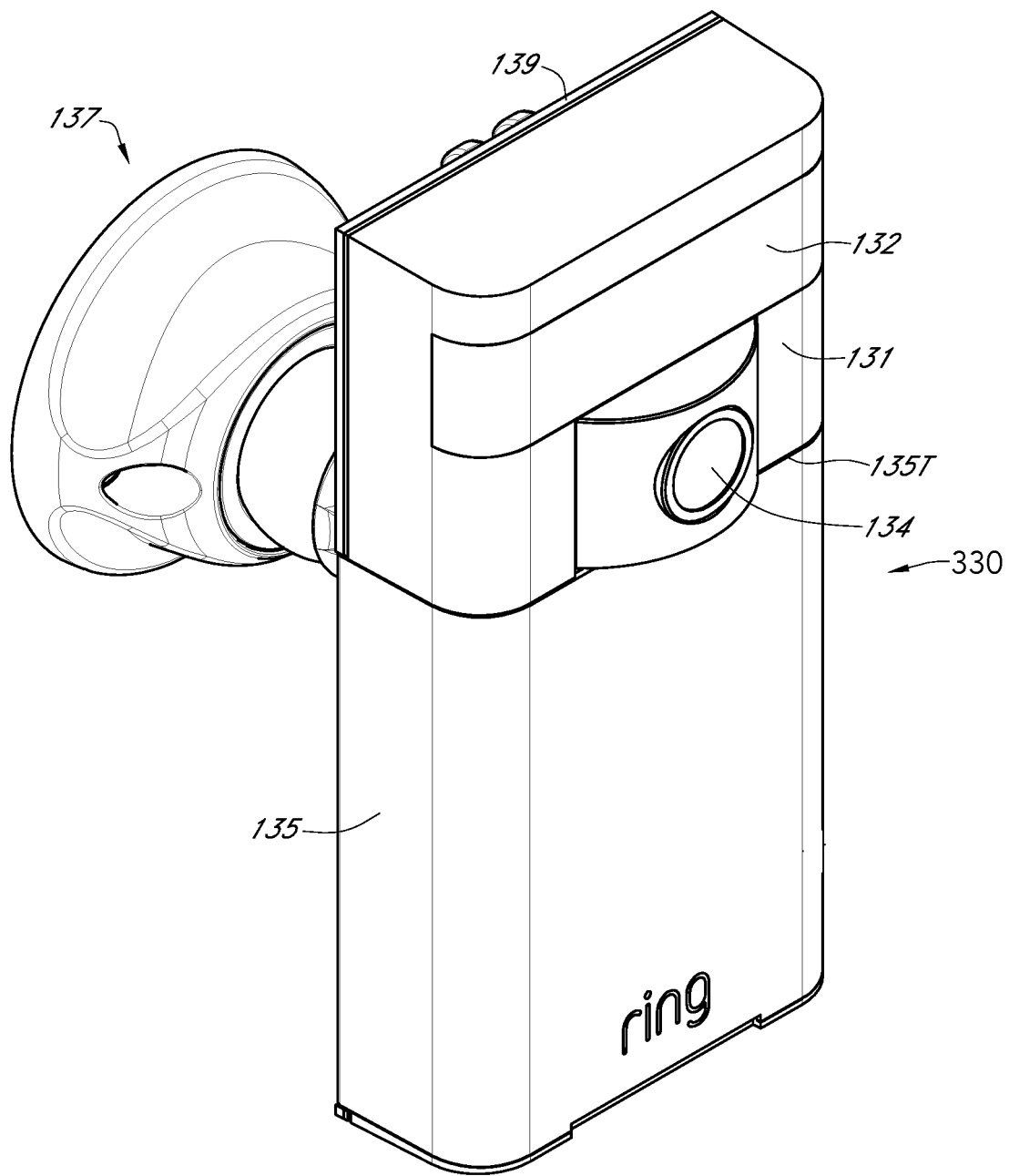
FIG. 3 is an upper front perspective view of an A/V recording and communication security camera, according to an aspect of the present disclosure.

FIG. 3 is an upper front perspective view of an A/V recording and communication camera (also referred to as a security camera in some embodiments), according to an aspect of the present embodiments. This figure illustrates that the security camera 330, similar to the video doorbell 130, includes a faceplate 135 that is mounted to a back plate 139 and an enclosure 131 that engages the faceplate 135. Collectively, the faceplate 135, the back plate 139, and the enclosure 131 form a housing that contains and protects the inner components of the security camera 330. However, unlike the video doorbell 130, the security camera 330 does not include any front button 133 for activating the doorbell. The faceplate 135 may comprise any suitable material, including, without limitation, metals, such as brushed aluminum or stainless steel, metal alloys, or plastics. The faceplate 135 protects the internal contents of the security camera 330 and serves as an exterior front surface of the security camera 330.

With continued reference to FIG. 3, the enclosure 131 engages the faceplate 135 and abuts an upper edge 135T of the faceplate 135. As discussed above with reference to FIG. 2, in alternative embodiments, one or more gaps between the enclosure 131 and the faceplate 135 may facilitate the passage of sound and/or light through the security camera 330. The enclosure 131 may comprise any suitable material, but in some embodiments the material of the enclosure 131 preferably permits infrared light to pass through from inside the security camera 330 to the environment and vice versa. The security camera 330 further includes a lens 132. Again, similar to the video doorbell 130, in some embodiments, the lens may comprise a Fresnel lens, which may be patterned to deflect incoming light into one or more infrared sensors located within the security camera 330. The security camera 330 further includes a camera 134, which captures video data when activated, as described above and below.

With reference to FIG. 3, the enclosure 131 may extend from the front of the security camera 330 around to the back thereof and may fit snugly around a lip (not shown) of the back plate 139. The back plate 139 may comprise any suitable material, including, without limitation, metals, such as brushed aluminum or stainless steel, metal alloys, or plastics. The back plate 139 protects the internal contents of the security camera 330 and serves as an exterior rear surface of the security camera 330. The faceplate 135 may extend from the front of the security camera 330 and at least partially wrap around the back plate 139, thereby allowing a coupled connection between the faceplate 135 and the back plate 139. The back plate 139 may have indentations (not shown) in its structure to facilitate the coupling.

With continued reference to FIG. 3, the security camera 330 further comprises a mounting apparatus 137. The mounting apparatus 137 facilitates mounting the security camera 330 to a surface, such as an interior or exterior wall of a building, such as a home or office. The faceplate 135 may extend from the bottom of the security camera 330 up to just below the camera 134, and connect to the back plate 139 as described above. The lens 132 may extend and curl partially around the side of the security camera 330. The enclosure 131 may extend and curl around the side and top of the security camera 330, and may be coupled to the back plate 139 as described above. The camera 134 may protrude from the enclosure 131, thereby giving it a wider field of view. The mounting apparatus 137 may couple with the back plate 139, thereby creating an assembly including the security camera 330 and the mounting apparatus 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 4:
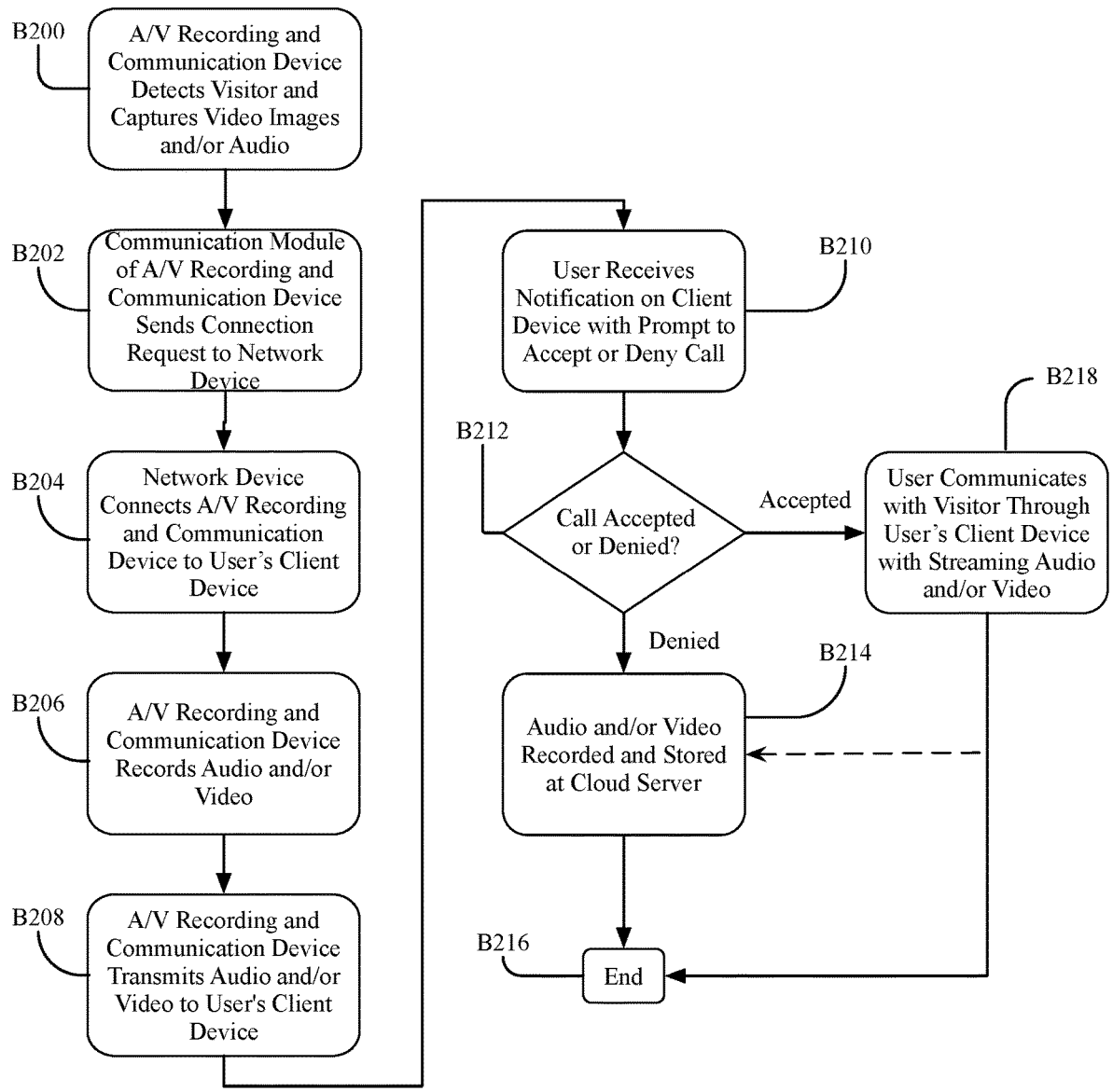
FIG. 4 is a flowchart illustrating a process for streaming and storing A/V content from an A/V recording and communication device, according to various aspects of the present disclosure.

FIG. 4 is a flowchart illustrating a process for streaming and storing A/V content from the A/V recording and communication device 100 (e.g., the video doorbell 130, the security camera 330, etc.), according to various aspects of the present disclosure. At block B200, the A/V recording and communication device 100 detects a visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor(s), and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a request, e.g., via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114, e.g., through the user's network 110 and the network 112. At block B206, the A/V recording and communication device 100 may record available audio and/or video data using the camera 102, the microphone 104, and/or any other device/sensor available. At block B208, the audio and/or video data is transmitted (e.g., streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification (or call), then at block B218 the user can communicate with the visitor through the user's client device 114 while audio and/or video data captured by the camera 102, the microphone 104, and/or other devices/sensors is streamed to the user's client device 114. In some of the present embodiments it is up to the user to enable the visitor to hear the user's voice (or to see a video of the user in some embodiments) by selecting/unselecting a voice and/or video option during the communication session. At the end of the call, the user may terminate the connection between the user's client device 114 and the A/V recording and communication device 100 and the communication session ends at block B216. In some embodiments, the audio and/or video data may be recorded and stored at a cloud server (block B214) even if the user accepts the notification and communicates with the visitor through the user's client device 114.

The specific operations of the above-described process may not be performed in the exact order shown and described. For example, in some aspects of the present embodiments block B210 is performed before the block B08. That is, the A/V recording and communication device 100 sends a notification (e.g., upon detecting the visitor's presence) to the user (e.g., to the user's client device 114) before transmitting the audio and/or video data to the client device 114 (e.g., through the user's network 110 and the network 112). Furthermore, the specific operations may not be performed in one continuous series of operations, and different specific operations may be performed in different embodiments. Additionally, the process could be implemented using several sub-processes, or as part of a larger macro process.

As discussed above, conventional A/V recording and communication devices may deploy other machines (e.g., remote servers) to perform computer vision processing for them. That is, the biometric data for a person captured by an A/V recording and communication device may be sent to one or more remote machines, via one or more networks, to process the data and to identify the person. This method of identification may not be very efficient due to its dependency to various factors such as the network delay and the processing rate of the remote machines. Therefore, it would be advantageous to increase the level of efficiency in identifying persons (and objects) by locally processing captured biometric data.

The present embodiments provide this and other advantages by performing all or part of the computer vision process (e.g., face and object recognition, fingerprint recognition, etc.) locally at the A/V recording and communication device(s). In some of the present embodiments, an A/V recording and communication device may receive, from a backend device such as a server, identification data, such as biometric data, for one or more known persons and/or objects, and store the received identification data at a memory of the A/V recording and communication device. In some of the present embodiments, an A/V recording and communication device may receive the identification data from different public and private resources. For example, the A/V recording and communication device may receive images of convicted felons and/or license plate numbers of stolen vehicles from one or more law enforcement agencies. As another example, the A/V recording and communication device may receive images of suspicious persons (as described below) captured by other A/V recording and communication devices (e.g., installed at different properties of a particular neighborhood) from one or more servers that keep such data.

Each time an A/V recording and communication device detects a person or an object, the A/V recording and communication device may capture identification data for the person or object (e.g., capture video images of a person that is within a field of view of a camera of the A/V recording and communication device) and may identify the detected person or object by comparing the identification data for the detected person or object (e.g., an image of the person and/or other biometric data related to the person) with the previously stored identification data. Since the entire process may be performed at the A/V recording and communication device and independent of other machines and/or networks, the efficiency of the identification process will be substantially increased.

Some of the present embodiments may comprise computer vision for one or more aspects, such as recognition of persons and objects. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of a person or an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Facial recognition, and shape recognition technology (SRT)—differentiating human beings (e.g., head and shoulder patterns) from objects.

Typical functions and components (e.g., hardware) found in many computer vision systems are described in the following paragraphs. The present embodiments may include at least some of these aspects. For example, with reference to FIG. 10, embodiments of the present A/V recording and communication device 100 may include a computer vision module 180. The computer vision module 180 may include any of the components (e.g., hardware) and/or functionality described herein with respect to computer vision, including, without limitation, one or more cameras, sensors, and/or processors. In some embodiments, the microphone 158, the camera 134, and/or the camera processor 170 may be components of the computer vision module 180.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D image, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 180). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many core DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 180 (FIG. 10), and/or the camera 154 and/or the processor 160 may receive information about the person using any one, or any combination of more than one, of the foregoing biometrics.

Figure 5:
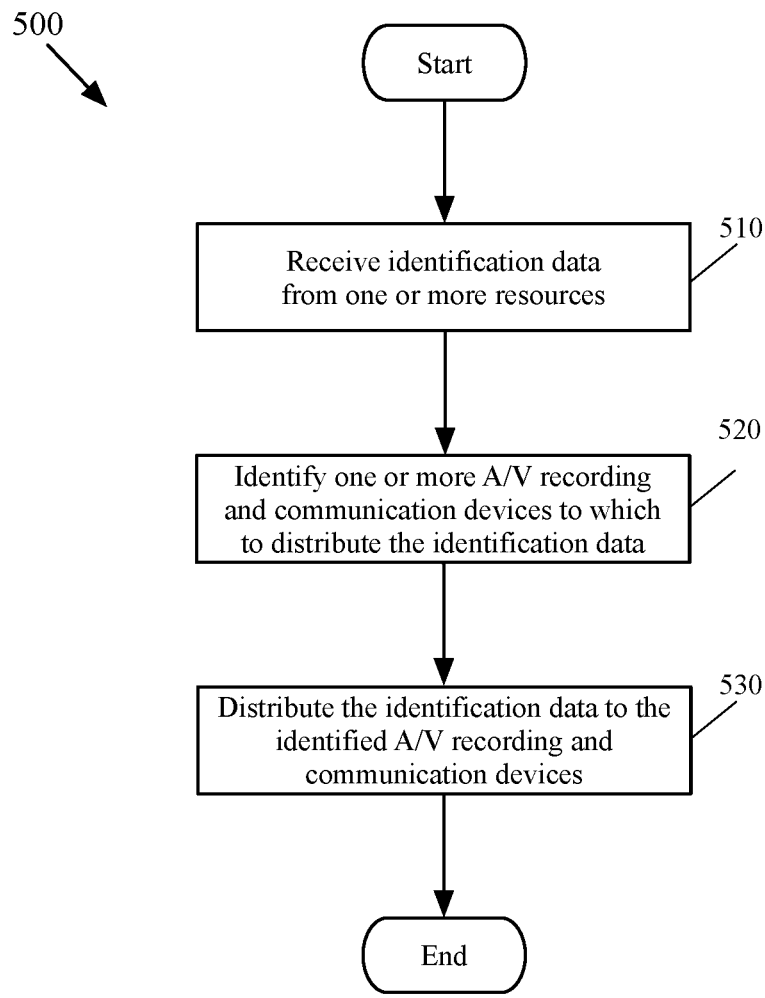
FIG. 5 is a flowchart illustrating a process for sharing identification data for known persons and/or objects with a plurality of A/V recording and communication devices, according to some aspects of the present disclosure.

FIG. 5 is a flowchart illustrating a process 500 for sharing identification data for known persons and/or objects with at least one A/V recording and communication device, according to some aspects of the present embodiments. In some of the present embodiments, this process 500 may be performed by one or more backend devices, such as the backend API 120 and/or the server 118 (FIG. 1). With reference to FIG. 5, the process 500 starts by receiving, at block 510, identification data, such as biometric data, from one or more resources. As described above, the resource(s) may include public resources of data, such as one or more law enforcement agencies, and/or private resources of data, such as one or more private servers that contain identification data for particular persons and/or objects (e.g., suspicious persons and/or objects). In some embodiments, the identification data may be pushed, from the resources of data, to one or more servers that may perform the process 500 described in FIG. 5. The data push may happen periodically, such as at regular intervals, and/or when a particular event occurs (e.g., each time the data is updated on a resource's side). In some other embodiments, the process 500 may request the identification data from the resource(s) periodically and/or upon occurrence of a certain event (e.g., upon a user's request).

With further reference to FIG. 5, at block 520 the process 500 identifies one or more A/V recording and communication devices to which the received identification data should be delivered. Depending on the subject of the identification data, some of the present embodiments may distribute the identification data to A/V recording and communication devices that are associated with different localities. For example, some of the present embodiments may use the location of each installed A/V recording and communication device to determine the A/V recording and communication devices to which the identification data should be sent based on the person/object for whom/which the identification data is being sent.

For example, if the identification data corresponds to a suspicious person observed in a neighborhood (e.g., by an A/V recording and communication device that is associated with one of the properties in the neighborhood), some aspects of the present embodiments may distribute the identification data to only A/V recording and communication devices that are associated with the properties in that same neighborhood (e.g., to every A/V recording and communication device that is installed at a property within the neighborhood boundaries). In another example, when the identification data corresponds to a "most wanted" criminal at large, some aspects of the present embodiments may distribute the identification data to every installed A/V recording and communication device, such as nationally and/or internationally.

With further reference to FIG. 5, after identification of the A/V recording and communication device(s), the process 500 sends (at block 530) the biometric data to the identified A/V recording and communication device(s). Some of the present embodiments may send the data through one or more networks. For example, some embodiments may use both the public network 112 and the user's network 110 (FIG. 1) to transmit the identification data to each identified A/V recording and communication device. After transmitting the identification data, the process 500 ends.

Figure 6:
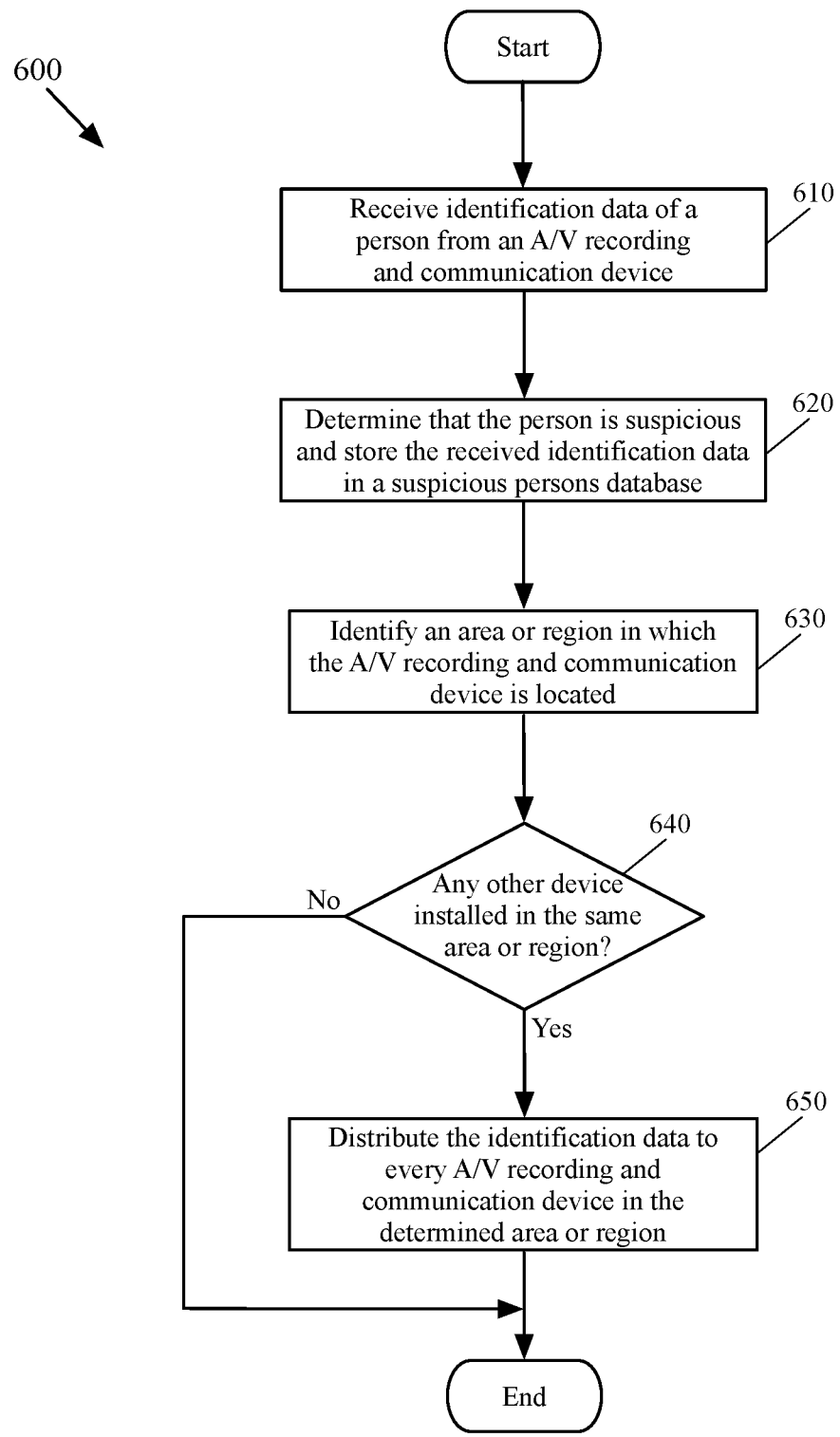
FIG. 6 is another flowchart illustrating a more detailed process for sharing the identification data received for a specific event with a specific set of A/V recording and communication devices, according to various aspect of the present disclosure.

FIG. 6 is a flowchart illustrating another process 600 for sharing identification data received for a specific event with a specific set of A/V recording and communication devices, according to various aspects of the present embodiments. The process 600 of FIG. 6 may be performed by one or more backend devices, such as the backend API 120 and/or the server 118 (FIG. 1). In some aspects of the present embodiments, some parts of this process 600 may be performed by a first set of backend servers while some other parts of the process 600 may be performed by a second set of servers. For example, in some embodiments a first server may determine that a person is suspicious, while a second server may identify the A/V recording and communication devices to which the identification data will be distributed. In yet other embodiments, an A/V recording and communication device may report a person as a suspicious person when the person engages in a suspicious activity, without using a remote server to identify the suspicious person.

Several of the present embodiments, including the process 600 described below, include determining that a person or persons captured by the camera of the A/V recording and communication device is a suspicious person. The present embodiments contemplate various methods for determining that a person is a suspicious person. For example, in some aspects of the present embodiments, when a person at, or near, a property engages in a suspicious activity, the process may tag the person as a suspicious person. One example of a suspicious activity is loitering. Loitering is often a prelude to a number of property and personal crimes, such as burglary, vandalism, breaking-and-entering, home invasion robbery, etc. Loitering may be identified in several of the present embodiments in a variety of ways. For example, in some embodiments, the A/V recording and communication device 100, 130, 330 may be configured to record and save image data of all persons who enter the field of view of the camera 102, 134 to create saved visitor images. These saved visitor images may then be automatically compared to the images of subsequent visitors (e.g., subsequent visitors who arrive within a certain period of time). Then, using the saved visitor images and the image data from a new visitor, if it is determined that the visitor has entered the field of view of the camera more than once within a predetermined period of time (may be referred to as a "suspicious loitering time warning value"), the process may report the person as a suspicious person (e.g., to a backend server). The process may also generate and send one or more alerts through one or more in-home alert devices and/or other client devices when a visitor is determined to be acting suspiciously.

Some embodiments may identify loitering as a result of a prolonged presence of the same person in the field of view of the camera of the A/V recording and communication device without a front button of the doorbell being pressed. For example, if the A/V recording and communication device 100 is a doorbell, such as the doorbell 130, then the process may determine whether the front button 133 of the doorbell 130 has been pressed. Then, if the doorbell button has not been pressed, and the suspicious loitering time warning value has been exceeded, the process may set a warning flag. In another embodiment for identifying suspicious behavior, including loitering, the process may employ two distinct A/V recording and communication devices. This method can advantageously identify suspicious behavior, for example, in the form of a person first approaching the front door of a property and then the back door of the same property.

Another form of suspicious behavior that can be identified by some of the present embodiments is carrying a suspicious object, such as a weapon or a burglary tool (e.g., a crowbar). The present embodiments also contemplate numerous methodologies for determining whether an object carried by a person who is present within the camera's field of view is a suspicious item, such as a weapon or a burglary tool. Any or all of these methodologies may include one or more aspects of computer vision. For example, in some embodiments, received image data of an object carried by a person within the camera's field of view may be determined to be a suspicious item by using object recognition software to compare images received from the A/V recording and communication device 100, 130, 330 to a database of images of weapons and/or burglary tools and/or other types of suspicious objects. Such a database, as described above, may be stored at a local storage, such as the storage 108 of the A/V recording and communication device 100, and/or at a remote storage, such as the storage 116 (FIG. 1). Upon determining that a person is carrying a suspicious object or a weapon, a suspicious person warning flag may be set by some of the present embodiments.

Another form of suspicious behavior is intentionally obscuring, or partially obscuring, a visitor's face, so that it cannot be seen or recognized by the A/V recording and communication device 100, 130, 330. In embodiments of the present methods, facial recognition software and object recognition software can be used to interact with one another, or to act alone, in order to determine, based on received image data of a person within the field of view of a camera of the A/V recording and communication device 100, 130, 330, that the person has used an object to obscure or partially obscure his or her face. When the process determines that a person is in the field of view of the camera, but that the person's face is obscured, or is obscured for some predetermined period of time, or that the person's face is obscured at the time that the person activates the doorbell, a suspicious person warning flag may be set by some embodiments.

In some aspects of the present embodiments, a person may be determined to be a suspicious person, regardless of the type of activity in which they are engaged, when the person is identified by matching with identification data from one or more sources. For example, a person may be determined to be a suspicious person if they are identified by matching with identification data from a database of known criminals (e.g., felons, sex offenders, etc.), or from a database of wanted persons (e.g., fugitives), or from a database of persons against whom a restraining order has been obtained, etc. In accordance with the present embodiments, the identity matching may be performed locally (e.g., at the A/V recording and communication device 100) using identification data obtained from the one or more sources.

Many more examples of suspicious activities, as well as methods of dynamic recognition of suspicious persons and/or activities by an A/V recording and communication device are provided in U.S. Non-Provisional patent application Ser. No. 15/905,683, filed on Feb. 26, 2018, entitled "IDENTIFICATION OF SUSPICIOUS PERSONS USING AUDIO/VIDEO RECORDING AND COMMUNICATION DEVICES," which is incorporated herein by reference in its entirety as if fully set forth.

With reference to FIG. 6, the process 600 starts by receiving, at block 610, identification data, such as biometric data, for a person from an A/V recording and communication device, such as any of the A/V recording and communication devices 100, 130, 330. Then, at block 620 the process 600 determines that the person identification data is received is a suspicious person (e.g., through one or more of the above-described methods) and stores the received identification data in a suspicious persons database, which may be, in some embodiments, a database stored at a data storage of the same server that receives the identification data, or the database might be stored at another data storage on a different server, in which case the process 600 may send the received identification data to the different server to store the identification data. One advantage of saving the received identification data in a centralized database (or combination of databases) is that identification data received from different A/V recording and communication devices may be accessed for later usage by one or more other systems, including frontend devices and/or backend devices.

For example, as described below at block 640, it might be determined that a neighborhood, at the time of receiving a suspicious person's identification data, does not have any known A/V recording and communication device associated with the neighborhood other than the A/V recording and communication device that has originated the identification data. Therefore, the received identification data may advantageously be saved in a centralized database so that when a new device is associated with the neighborhood (e.g., when a new A/V recording and communication device is installed at a property within the neighborhood), the saved identification data may be sent to the new A/V recording and communication device.

As discussed above, some of the present embodiments may identify a suspicious activity and/or a suspicious person at the A/V recording and communication device (e.g., without using any backend devices), and may subsequently report the suspicious person to a backend server (or other backend device) to be shared with other A/V recording and communication devices. The A/V recording and communication device of some such embodiments may perform a computer vison process locally using, e.g., the camera 134, the computer vision module 180, and/or the processor 163, as described below with reference to FIG. 10.

With further reference to FIG. 6, after storing the received identification data, the process 600 may identify (at block 630) a neighborhood in which the A/V recording and communication device that has sent the identification data is located. As described above, the locations of at least some A/V recording and communication devices may be known. For example, the users of such devices may provide a street address for each device as part of a device setup process. Therefore, after receiving the identification data, the process 600 may determine an area, such as a neighborhood, or a region in which the A/V recording and communication device is located. The process 600 may then determine, at block 640, whether any other A/V recording and communication devices are located within the same area or region. If the process determines that no other A/V recording and communication device is installed within the same area or region, the process ends. However, if the process determines that at least one other A/V recording and communication device is installed within the same area or region, such as a same neighborhood, then the process distributes (at block 650) the identification data for the suspicious person to at least some (e.g., every) of the A/V recording and communication devices that located in the same area or region. The process then ends.

The specific operations of the above-described process 600 may not be performed in the order shown and described. Furthermore, the specific operations may not be performed in one continuous series of operations, and different specific operations may be performed in different embodiments. For example, before distributing the identification data to the A/V recording and communication devices (at block 650), the process 600 of some of the present embodiments may determine whether the A/V recording and communication devices have received the identification data before. The process 600 of some such embodiment may then send the identification data only to those A/V recording and communication devices that have not have already received the identification data. Additionally, the process 600 could, in some embodiments, be implemented using several sub-processes, or as part of a larger process.

Figure 7A:
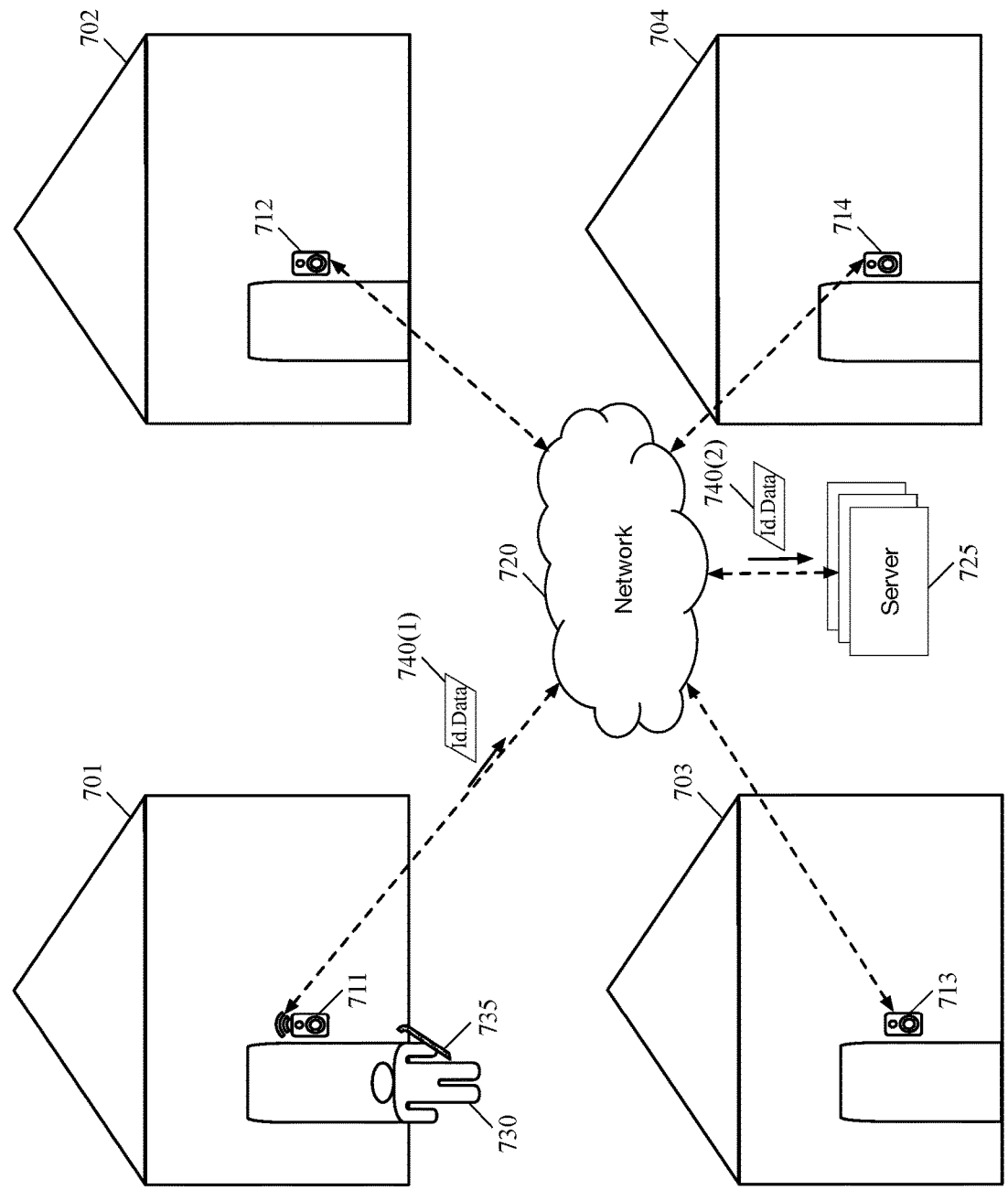
FIGS. 7A-7B are schematic diagrams of a plurality of structures, illustrating an example of sharing identification data for a suspicious person at, or near, a property with the other properties that are within the same neighborhood, according to some aspects of the present disclosure.
Figure 7B:
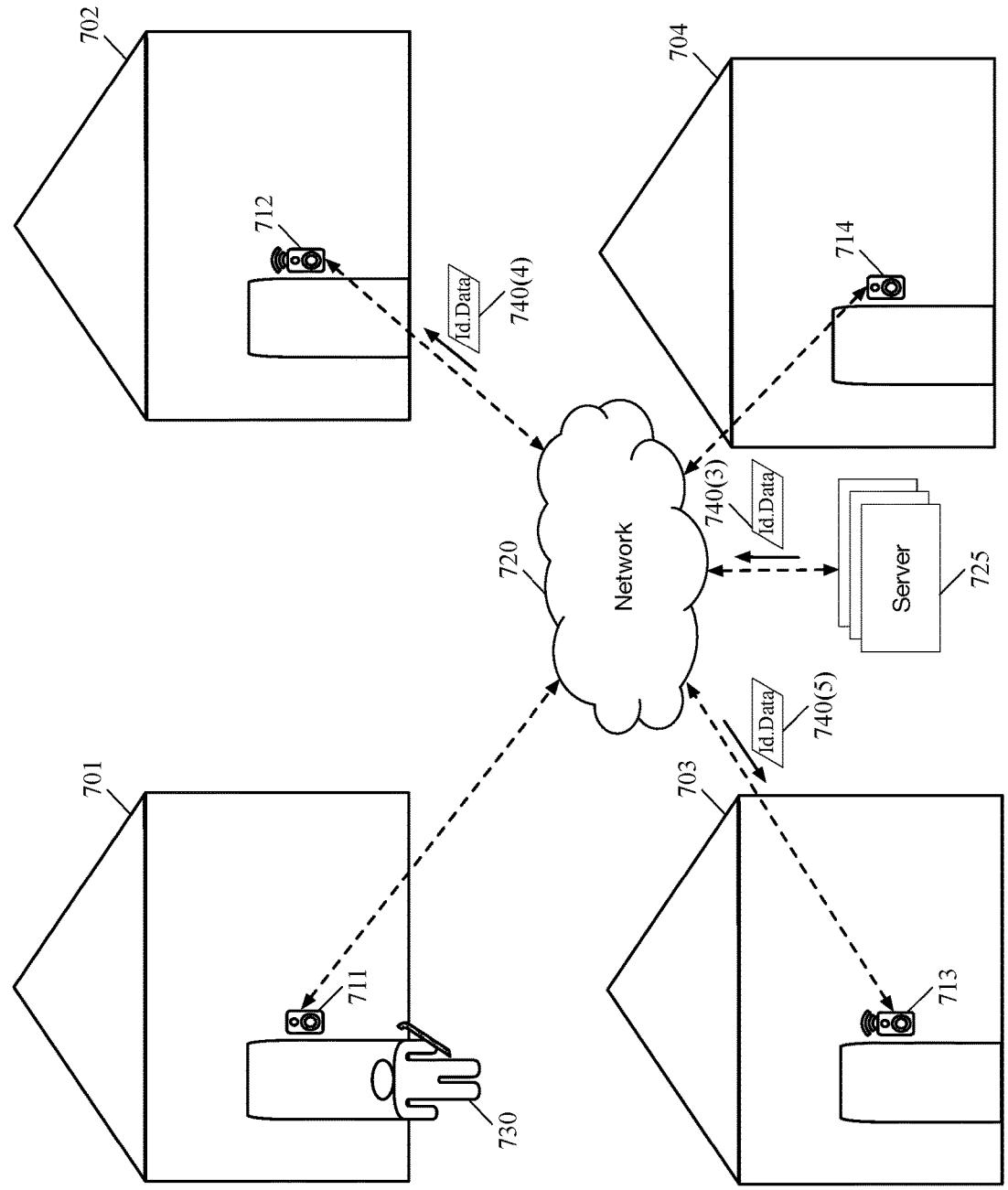

FIGS. 7A-7B are schematic diagrams of a plurality of structures 701-704, illustrating an example of sharing identification data for a suspicious person detected at, or near, a property with the other properties that are within the same neighborhood, according to some aspects of the present embodiments. With reference to FIG. 7A, the illustrated embodiment comprises a set of A/V recording and communication devices 711-714 (e.g., video doorbells, security cameras, etc.) installed at four different structures, such as the houses 701-704. The set of A/V recording and communication devices 711-714 may communicate with one or more backend devices, such as a set of servers 725, through a network 720 (and possibly other networks that are not shown in the figure such as the users's networks operating in each of the houses 701-704). FIG. 7A also shows a person 730 standing near an outside door of the first house 701 and holding a crowbar 735. While FIGS. 7A-7B show a set of houses 701-704, the present embodiments are not limited to houses. Rather, the present embodiments are applicable to any type of property and/or structure, including, without limitation, houses, apartments, offices, businesses, storage facilities, etc.

With further reference to FIG. 7A, when the first A/V recording and communication device 711 detects the person 730, the first device 711 may capture video images of the person 730 that is within a field of view of a camera of the first A/V recording and communication device 711. The first A/V recording and communication device 711 may also capture audio through the first device 711's microphone (if so equipped). As described above, the first A/V recording and communication device 711 may detect the visitor 730 by detecting motion using its camera and/or one or more motion sensors. The first A/V recording and communication device 711 may also detect the visitor 730 when the visitor 730 presses a front button of the first A/V recording and communication device 711 (e.g., when the first A/V recording and communication device 711 is a video doorbell).

As soon as the visitor 730's presence is detected, the first A/V recording and communication device 711 may send a notification (along with streaming video and, in some embodiments, audio) to a client device as described above with reference to FIG. 4. Various aspects of the present embodiments may also notify any persons inside the first house 701 using one or more in-home alert devices. The first A/V recording and communication device 711 may also, in some of the present embodiments, send the person 730's identification data 740 (e.g., one or more of the video images captured of the person 730 and/or other identifying data, such as biometric data) to the server 725 to identify the person 730 as a suspicious person (e.g., since the person 730 is carrying a suspicious object, as described above). The person 730's identification data 740 may be sent in a first signal 740(1) from the first A/V recording and communication device 711 to the network 720 and a second signal 740(2) from the network 720 to the server 725.

In some other aspects of the present embodiments, the first A/V recording and communication device 711 may identify the person 730 as a suspicious person by performing a computer vision process locally, and/or may identify the carried object 735 as a suspicious object (e.g., by comparing the image of the carried object 735 with a local data store that contains images of known suspicious objects), and may then report the suspicious person to the server 725. The first A/V recording and communication device 711 may also identify the person 730 as a suspicious person by comparing the identification data 740 (e.g., images) of the person 730 with a local data store that contains images of known suspicious persons, where the images of known suspicious persons may have been transmitted to the first A/V recording and communication device 711 from one or more backend devices, as described above.

When the person 730 is determined to be a suspicious person, instead of, or in conjunction with, a standard notification (e.g., a push notification with streaming A/V content sent to the client device), the first A/V recording and communication device 711 may send a second, different type of alert (e.g., a loud noise, screen flashing, or any other type of warning notification) to the client device. Additionally, the first A/V recording and communication device 711 may also send a visual and/or audible notification to any persons present at the first house 701 (e.g., by activating one or more smart LED lights inside the first house 701, by verbally warning the person(s) inside the first house 701 using one or more speakers installed inside the property, etc.).

With reference to FIG. 7B, when a server (e.g., one of the set of servers 725) receives the identification data 740, the server 725 may perform a computer vision process, instead of or in addition to a computer vision process performed by the first A/V recording and communication device 711, on the identification data 740 to attempt to determine whether the person 730 is a suspicious person. The server 725 may then store the identification data 740 at a data storage. The server 725 (or another server) may then identify the second and third A/V recording and communication devices 712 and 713 (associated with the second and third houses 702 and 703, respectively) as being located in the same neighborhood as the first house 701. After determining that the second and third A/V recording and communication devices 712 and 713, associated with the second and third houses 702 and 703, respectively, do not have the identification data 740 for the suspicious person 730, the server 725 may then distribute the identification data 740 to the second and third A/V recording and communication devices 712 and 713 in a third signal 740(3) from the server 725 to the network 720 and in fourth and fifth signals 740(4), 740(5) from the network 720 to the second and third A/V recording and communication devices 712 and 713, respectively. As shown in FIG. 7B, the identification data 740 of the suspicious person 730 is not shared with the fourth A/V recording and communication device 714 associated with the fourth house 704, because this property is not in the same neighborhood as the other properties 701-703.

The example illustrated with reference to FIGS. 7A-7B is only one example of a source of identification data being an A/V recording and communication device associated with a property within a neighborhood. As described above, the source of identification data can be any other public and/or private source. For example, the set of servers 725 may receive identification data from one or more law enforcement agencies, and may share the identification data with any of the A/V recording and communication devices 711-714. The identification data may correspond to persons and/or objects. For example, the set of servers 725 may receive images of one or more criminals, or the license plate numbers of one or more stolen vehicles, and may share this identification data with any or all of the A/V recording and communication devices 711-714.

Figure 8:
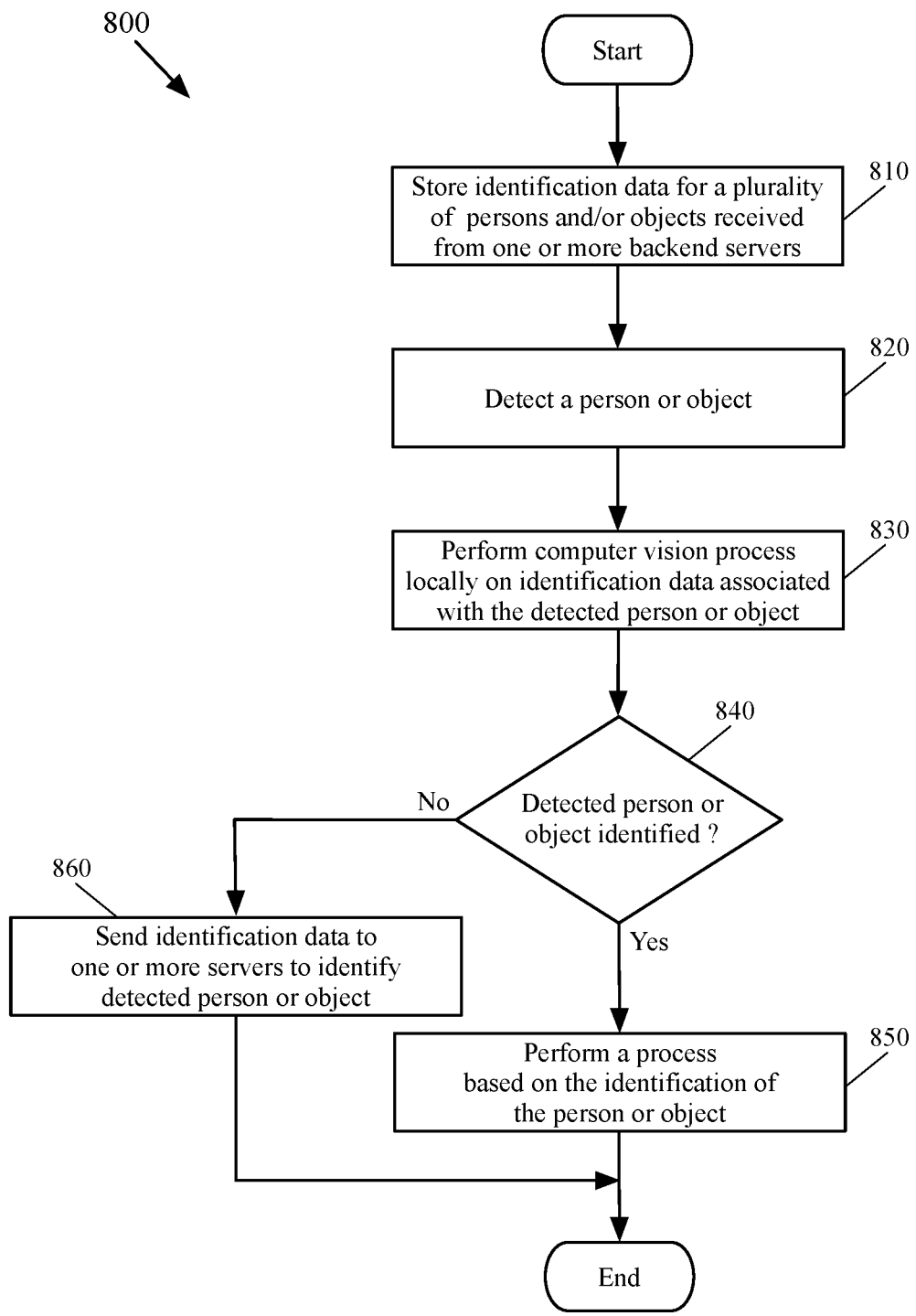
FIG. 8 is a flowchart illustrating a process for storing identification data on a local memory of an A/V recording and communication device and performing identification process locally leveraging the stored data, according to various aspects of the present disclosure.

FIG. 8 is a flowchart illustrating a process 800 for storing identification data at a local memory of an A/V recording and communication device, and performing a computer vision (identification) process locally by leveraging the stored data, according to various aspects of the present embodiments. In some of the present embodiments, the process 800 of FIG. 8 may be performed entirely by the A/V recording and communication device, which may be, for example, any of the A/V recording and communication devices 100, 130, 330 describe herein. With reference to FIG. 8, the process 800 initiates by receiving, from one or more backend servers, and storing (at block 810) identification data associated with one or more persons and/or objects. As described above, the identification data may be biometric data such as an image, a fingerprint, etc., of a person, or other types of identification data associated with an object.

After receiving the identification data, at block 820, the process 800 may detect a new person or object at, or near, the property at which an A/V recording and communication device is installed. For example, and as described above, the process 800 may detect a person by detecting motion of the person using a camera and/or one or more motion sensors of the A/V recording and communication device. The process 800 may also detect a person when the person presses a front button of the A/V recording and communication device (e.g., when the A/V recording and communication device is a video doorbell). The process 800 may then capture identification data associated with the person or object by, e.g., recording video images of the person or object.

At block 830, the process 800 performs a computer vision process on the captured identification data to identify the person or object. As described above, the computer vision process may include face recognition or any other biometrics recognition process, and/or an object recognition process. For example, the process 800 may compare the image of the person with different images of known persons, authorized persons, criminals, etc., stored in one or more local data stores of the A/V recording and communication device in some aspects of the present embodiments. As another example, the process 800 may compare a license plate number captured from a vehicle detected by the A/V recording and communication device with a plurality of license plate numbers stored at a local memory of the A/V recording and communication device.

At block 840, the process 800 determines whether the person or object could be identified through the computer vision process (e.g., whether a match for the received identification data was found in any of the local data stores). When the process 800 determines that no match was found, in some of the present embodiments, the process 800 may send (at block 850) the captured identification data to one or more backend servers (e.g., the same servers from which identification data for different persons and/or objects was received, or different servers) to perform further identification processes on the captured data.

However, when the process 800 matches the identification data for the captured person or object against one or more of the local data stores, the process 800 may perform (at block 860) any required process based on the identified person or object. For example, when the process 800 identifies a detected person as a criminal at large reported by the police, the process 800 may send an alert to local authorities and/or law enforcement agencies. Of course, this alert may be in addition to one or more alerts sent to any authorized user(s) and/or property occupants associated with the A/V recording and communication device, as described above. For example, when the process 800 determines that a convicted felon is at a property associated with the A/V recording and communication device, the process 800 may alert the occupants of the property by turning on one or more lights inside the property, or by sending verbal warnings to the occupants. In addition to sending audible and/or visual alerts to the occupants, the process 800 may send particular types of visual and audible notifications to one or more client devices of the authorized users (e.g., generating a siren sound, flashing the display screen of the client device, etc.).

Although many of the present embodiments have been described with reference to persons detected by, or present in the area about, the A/V recording and communication device, the present embodiments are not limited, however, to scenarios involving humans. For example, the present embodiments may an event associated with an abject (e.g., a bot, a drone, etc.) as a high ranked event when these embodiments contemplate that suspicious behavior may be committed by the object. For example, in some instances, the mere presence of a bot or drone in an event generated by an A/V recording and communication device may cause the event to be ranked as an important event, while in other instances, loitering by a drone will cause the event to be identified as important.

The specific operations of the above-described process 800 may not be performed in the order shown and described. Furthermore, the specific operations may not be performed in one continuous series of operations, and different specific operations may be performed in different embodiments. For example, before performing the computer vision process at the A/V recording and communication device (at block 830), the process 800 of some of the present embodiments may send a notification along a streaming video of the detected person or object to one or more authorized users associated with the A/V recording and communication device. Additionally, the process 800 could be implemented using several sub-processes, or as part of a larger process.

Figure 9:
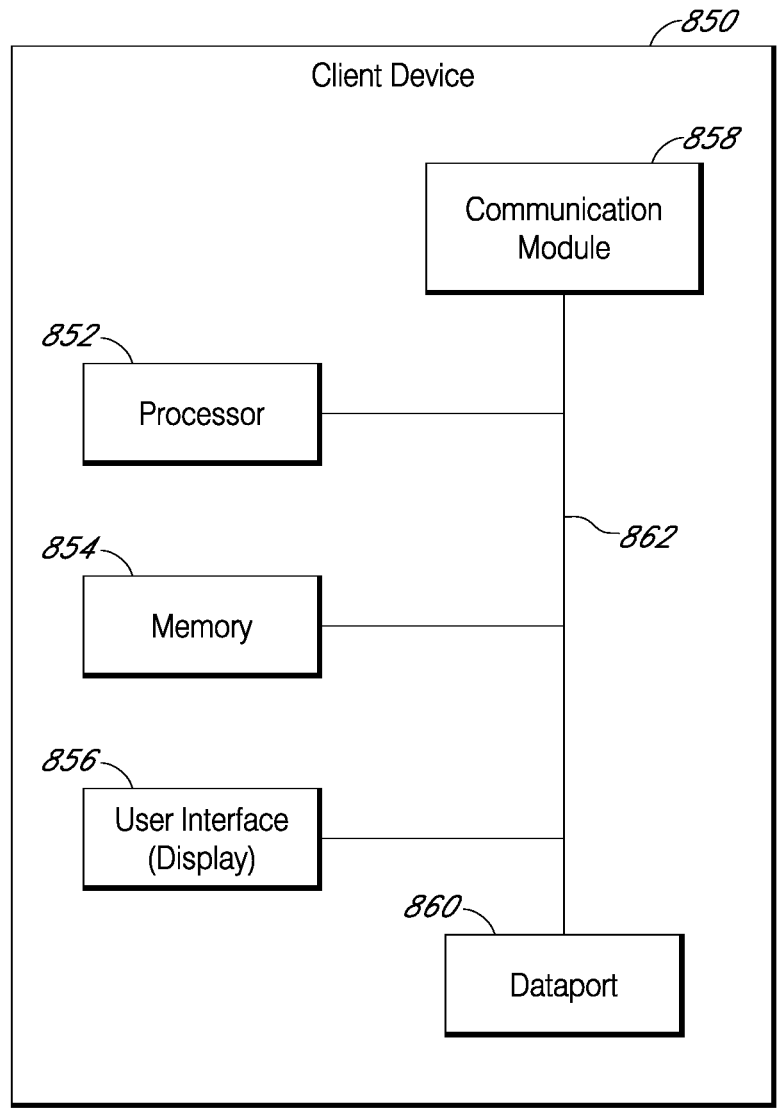
FIG. 9 is a functional block diagram of a client device on which the present embodiments may be implemented, according to various aspects of the present disclosure.

FIG. 9 is a functional block diagram of a client device 850 on which the present embodiments may be implemented according to various aspects of the present disclosure. The user's client device 114 described with reference to FIG. 1 may include some or all of the components and/or functionality of the client device 850. The client device 850 may comprise, for example, a smartphone.

With reference to FIG. 9, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM)). In some embodiments, the processor 852 may include one or more other processors, such as one or more conventional microprocessors, and/or one or more supplementary co-processors, such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connected to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 808 before being directed to the dataport 860. The communication module 858 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 10:
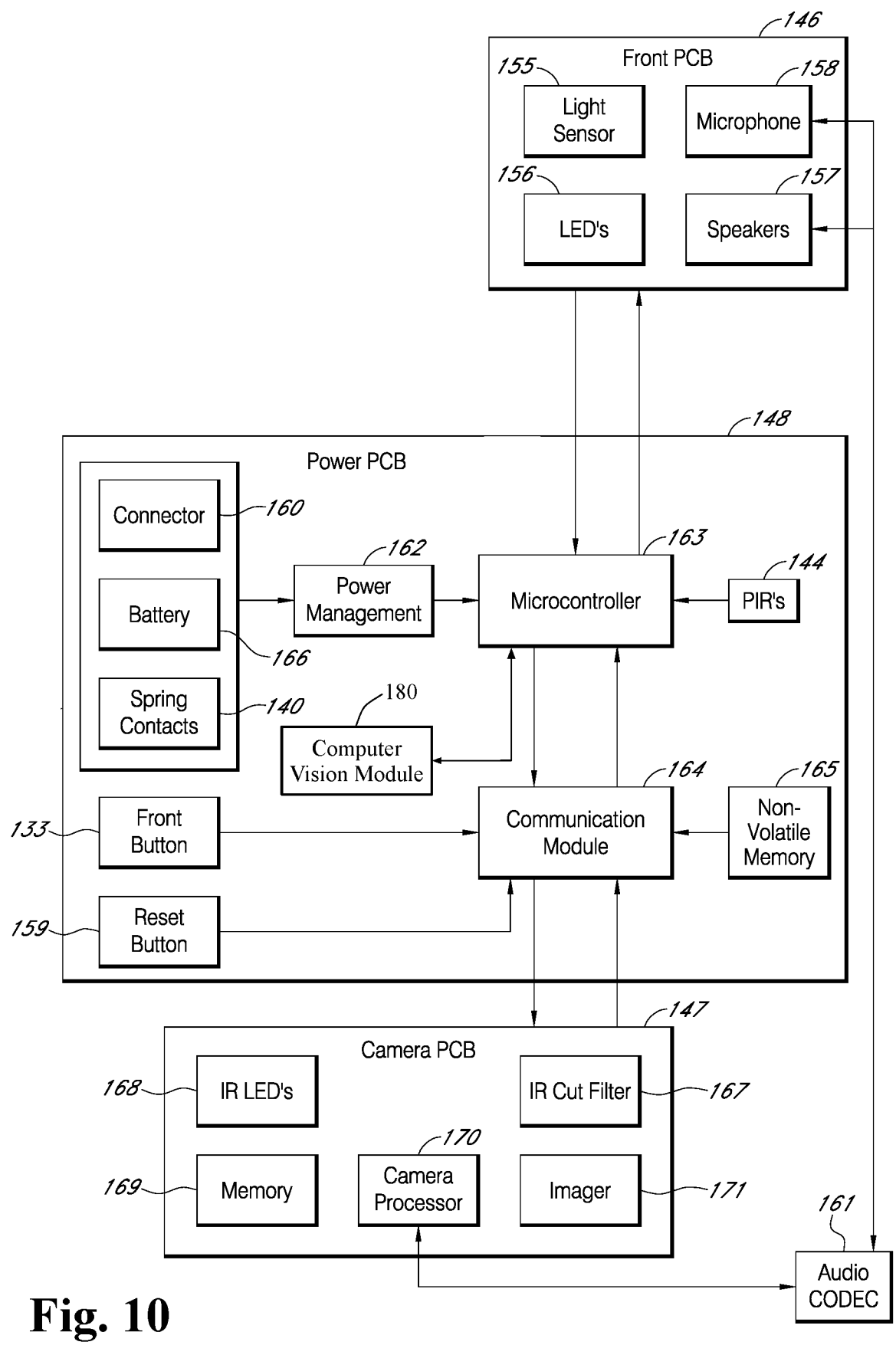
FIG. 10 is a functional block diagram illustrating an embodiment of an A/V recording and communication device, according to various aspects of the present disclosure.

FIG. 10 is a functional block diagram illustrating various components of the A/V recording and communication doorbell 130 and their relationships to one another. The A/V recording and communication doorbell 130 may include a front PCB (printed circuit board) 146 comprising a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. The LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through a communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 10, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 10, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 10, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 10, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p, or 1080p, or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

While not shown separately, the components of the A/V recording and communication security camera 330, and their relationships to one another, may be similar to, or substantially the same as, the components of the A/V recording and communication doorbell 130 described above and illustrated in FIG. 10, but without the front button 133 and its related components.

Figure 11:
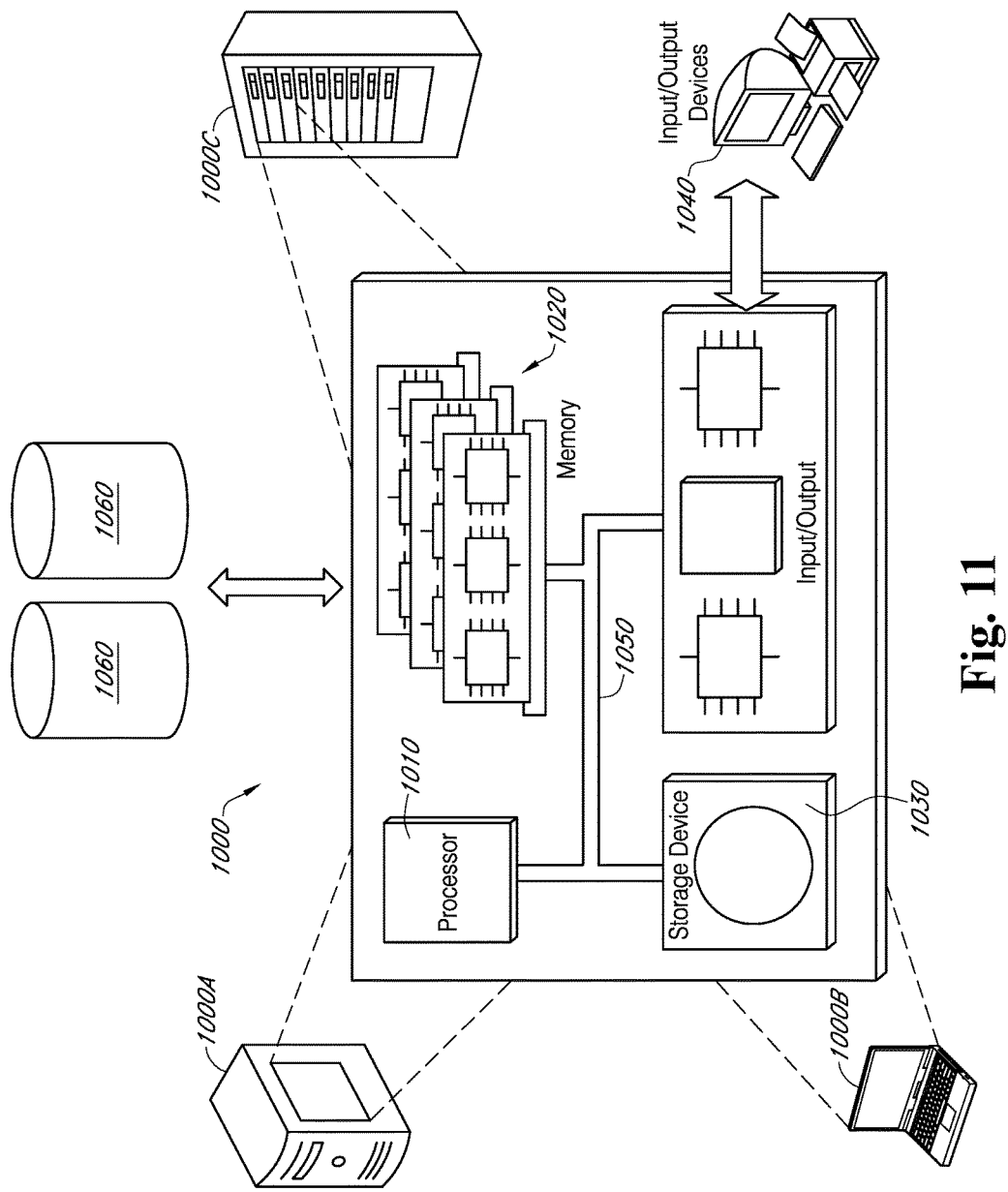
FIG. 11 is a functional block diagram of a general-purpose computing system on which the present embodiments may be implemented, according to various aspects of present disclosure.

FIG. 11 is a functional block diagram of a general-purpose computing system on which the present embodiments may be implemented according to various aspects of the present disclosure. The computer system 1000 may be embodied in at least one of a personal computer (also referred to as a desktop computer) 1000A, a portable computer (also referred to as a laptop or notebook computer) 1000B, and/or a server 1000C. A server is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1000 may execute at least some of the operations described above. The computer system 1000 may include at least one processor 1010, memory 1020, at least one storage device 1030, and input/output (I/O) devices 1040. Some or all of the components 1010, 1020, 1030, 1040 may be interconnected via a system bus 1050. The processor 1010 may be single- or multi-threaded and may have one or more cores. The processor 1010 may execute instructions, such as those stored in the memory 1020 and/or in the storage device 1030. Information may be received and output using one or more I/O devices 1040.

The memory 1020 may store information, and may be a computer-readable medium, such as volatile or non-volatile memory. The storage device(s) 1030 may provide storage for the system 1000, and may be a computer-readable medium. In various aspects, the storage device(s) 1030 may be a flash memory device, a hard disk device, an optical disk device, a tape device, or any other type of storage device.

The I/O devices 1040 may provide input/output operations for the system 1000. The I/O devices 1040 may include a keyboard, a pointing device, and/or a microphone. The I/O devices 1040 may further include a display unit for displaying graphical user interfaces, a speaker, and/or a printer. External data may be stored in one or more accessible external databases 1060.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a GUI and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for sharing identification data with a plurality of audio/video (A/V) recording and communication devices, the method comprising:
    receiving identification data for a person and/or an object; and
    transmitting the identification data to the plurality of A/V recording and communication devices for storage at a memory of each of the A/V recording and communication devices and for local processing of the identification data by a processor of each of the A/V recording and communication devices, wherein the A/V recording and communication devices comprise a plurality of security cameras and/or a plurality of video doorbells, the plurality of security cameras and/or plurality of video doorbells associated with two or more respective addresses within a single area.

2. The method of claim 1, wherein receiving the identification data comprises receiving the identification data from law enforcement.

3. The method of claim 1, wherein receiving the identification data comprises receiving the identification data from one of the plurality of A/V recording and communication devices.

4. The method of claim 1, wherein the identification data comprises biometric data of the person.

5. The method of claim 4, wherein the biometric data comprises an image of the person.

6. The method of claim 1, wherein the object comprises a vehicle, and wherein the identification data comprises a license plate number of the vehicle.

7. A method for identifying persons using an audio/video (A/V) recording and communication device having a camera, the method comprising:
    receiving, from a backend device in network communication with the A/V recording and communication device, first identification data for a first person;
    storing the first identification data at a memory of the A/V recording and communication device;
    capturing, using the camera of the A/V recording and communication device, image data for a second person;
    performing, by the A/V recording and communication device, a computer vision process on the image data for the second person to create second identification data for the second person; and
    determining whether the second person and the first person are the same person by comparing the second identification data for the second person with the first identification data for the first person.

8. The method of claim 7 further comprising sending a notification to a client device associated with the A/V recording and communication device when the first and second persons are determined to be the same person.

9. The method of claim 7 further comprising sending a notification to law enforcement when the first and second persons are determined to be the same person.

10. The method of claim 7 further comprising sending the image data for the second person to the backend device when the first and second persons are determined to be different persons.

11. The method of claim 7, wherein the A/V recording and communication device comprises a motion sensor, and wherein the image data for the second person is captured in response to the motion sensor detecting the second person.

12. The method of claim 11, wherein the motion sensor comprises a passive infrared (PIR) sensor.

13. The method of claim 7, wherein the first identification data for the first person comprises biometric data of the first person.

14. The method of claim 7 further comprising determining that the second person is acting suspiciously and sending the image data for the second person to the backend device.

15. The method of claim 14, wherein determining that the second person is acting suspiciously comprises determining that the second person is carrying a suspicious object.

16. The method of claim 15, wherein determining that the second person is carrying the suspicious object comprises performing a computer vision process on the image data for the second person.

17. A non-transitory machine-readable medium of an audio/video (A/V) recording and communication device storing a program for identifying objects, the program executable by at least one processing unit of the A/V recording and communication device, the program comprising sets of instructions for:
    receiving, from a backend device in network communication with the A/V recording and communication device, first identification data for a first object;
    storing the first identification data at a memory of the A/V recording and communication device;

capturing, using a camera of the A/V recording and communication device, image data for a second object;

performing, by the A/V recording and communication device, a computer vision process on the image data for the second object to create second identification data for the second object;

determining whether the second object and the first object are the same object by comparing the second identification data for the second object with the first identification data for the first object.

18. The non-transitory machine-readable medium of claim 17 wherein the program further comprises a set of instructions for sending a notification to a client device associated with the A/V recording and communication device when the first and second objects are determined to be the same object.

19. The method of claim 17, wherein the A/V recording and communication device comprises a motion sensor, and wherein the set of instructions for capturing the image data for the second object comprises a set of instructions for capturing the image data in response to the motion sensor detecting the second object.

20. The method of claim 19, wherein the motion sensor comprises a passive infrared (PIR) sensor.

21. The method of claim 17, wherein the first and second objects are vehicles, and wherein the first identification data for the first object comprises a license plate number of the first vehicle.

* * * * *